United States Patent [19]
Kao

[11] 4,187,468
[45] Feb. 5, 1980

[54] ELECTRONIC CLOCK RADIO HAVING NAP/SLEEP FEATURE

[75] Inventor: Lin Kao, Hong Kong, Hong Kong

[73] Assignee: GTE Sylvania Far East Limited, Kowloon, Hong Kong

[21] Appl. No.: 790,441

[22] Filed: Apr. 25, 1977

[30] Foreign Application Priority Data

Jun. 29, 1976 [GB] United Kingdom ............... 27122/76

[51] Int. Cl.[2] ......................... H04B 1/06; G04C 21/16

[52] U.S. Cl. .................................... 325/396; 58/19 R; 58/38 R; 58/152 B

[58] Field of Search ................. 58/16.5, 21.15, 21.155, 58/38 R, 152 B, 19 R, 38 R; 325/396

[56] References Cited

U.S. PATENT DOCUMENTS

| | | | |
|---|---|---|---|
| 3,686,878 | 8/1972 | Patrick et al. | 58/21.155 |
| 3,888,075 | 6/1975 | Wecker | 58/38 R |
| 3,949,240 | 4/1976 | Saito et al. | 58/38 R |

*Primary Examiner*—Edith S. Jackmon
*Attorney, Agent, or Firm*—Theodore D. Lindgren

[57] ABSTRACT

An electronic clock radio using a clock integrated circuit and a radio integrated circuit. A first energizing potential when applied to the NAP/SLEEP input connection of the clock circuit, causes the clock circuit to switch from a first electric state to a second electric state. After a selected interval of time, not greater than 60 minutes, the clock circuit switches from the second electric state to the first electric state. The radio, normally in an OFF state is placed in an ON state only upon receiving a second energizing potential applied to its input connection. A control circuit, having a manually operable switch with NAP and SLEEP positions and being responsive to the electric states of the clock circuit, connects this second energizing potential to the radio input only when:

(i) the manually operable switch is in the NAP position and the clock circuit is the first electric state, or (ii) the manually operable switch is in the SLEEP position and the clock circuit is in the second electric state.

1 Claim, 1 Drawing Figure

ELECTRONIC CLOCK RADIO HAVING NAP/SLEEP FEATURE

BACKGROUND OF THE INVENTION

This invention relates to electronic clock radios using large scale integration and to the NAP or SNOOZE features provided in such radios.

Many consumer oriented electronic clock radios essentially consist of three integrated circuits (IC's) : a radio, a clock, and an electronic digital display. An AC-to-DC voltage regulator, which provides the correct bias voltages to the IC's may or may not be included as an integrated device. The remaining circuitry in the clock radio consists of IC interconnections and interface components.

Included in the various features which such commercial radios provide is the SLEEP function. The SLEEP function is initiated by a SLEEP switch which activates the radio for a selected time interval, usually 1 to 60 minutes. At the end of this time period the radio automatically turns OFF. Another standard feature is the WAKE-UP ALARM which automatically turns the radio ON (or activates a buzzer) when the displayed time and a preselected time setting coincide. Associated with the WAKE-UP ALARM feature is the NAP (also called SNOOZE) function. Once the ALARM circuit has turned the radio ON, the NAP switch can shut the radio OFF for some standard time interval—usually 9 to 10 minutes. The intended purpose of the NAP function is to allow the user to sleep or rest for a short interval after the alarm has sounded or after the radio has been activated.

Since the NAP feature can only be used in conjunction with the WAKE-UP ALARM, its use is limited to a very specific time of day unless the 24 hour alarm setting is changed. And, it is undesirable to disturb this alarm setting since the user might forget to reset the alarm time setting and fail to be awakened at the usual time. This generally precludes the use of the NAP function at any other time, or for any rest period other than the built-in interval of 9 to 10 minutes.

OBJECTS AND SUMMARY OF THE INVENTION

It is an object of this invention to provide a NAP function in an electronic clock radio that does not have to be used in conjunction with the WAKE-UP ALARM.

It is another object of this invention to incorporate into an integrated clock radio a NAP feature having an adjustable NAP time period without adding a separate timing circuit just for this function.

In accordance with one embodiment of this invention a clock integrated circuit and a radio are electrically connected via a control circuit. A first energizing potential applied to the NAP/SLEEP input connection of the IC, causes the clock to switch from a first electric state to a second electric state. After a selected interval of time, the clock switches from the second electric state to the first electric state. The clock IC also includes a provision for selecting this interval of time for periods not greater than 60 minutes. The radio, normally in an OFF state is placed in an ON state only upon receiving a second energizing potential applied to its input connection. The control circuit, having a manually operable switch with NAP and SLEEP positions and being responsive to the electric states of the clock, connects this second energizing potential to the radio input only when:

(i) the manually operable switch is in the NAP position and the clock is in the first electric state, or (ii) the manually operable switch is in the SLEEP position and the clock is in the second electric state.

DETAILED DESCRIPTION OF PREFERRED EMBODIMENTS

Figure 1:
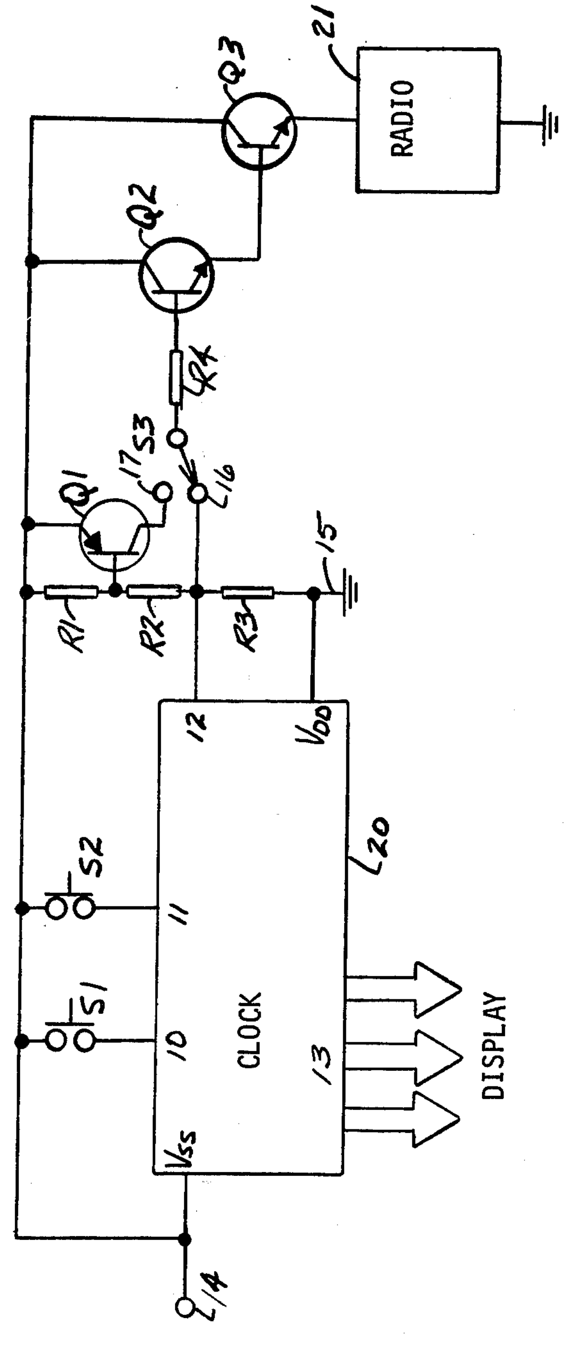
FIG. 1 shows a schematic diagram which illustrates one embodiment of this invention.

The major part of an electronic clock radio is shown in block form in FIG. 1 with many of the normal circuit interconnections removed since their presence and operation are not relevant to this invention. Clock IC 20 provides all the necessary logic circuitry for the timekeeping function of a digital clock radio. Such devices are widely available commercially, e.g., Digital Alarm Clock, part No. S1998, and manufactured by American Micro-Systems, Inc., would satisfy the requirements of clock 20. The clock devices 20 is powered by an energizing potential, usually a positive DC voltage, which connects to imput terminal 14. This provides the necessary substrate voltage, $V_{SS}$ to the device. The other IC supply voltage input, $V_{DD}$, is connected to a ground reference potential 15. Outputs 13 connect to a digital display device not shown in FIG. 1. Output 12 is the SLEEP output connection which is usually associated with the SLEEP function discussed above. Switch S2 is used to activate this functional output. By mementarily connecting terminal 11 to $V_{SS}$, clock output terminal 12 changes from an open circuit condition to a $V_{SS}$ voltage, for a predetermined time.

In prior clock radio applications output 12 would be connected to an interface circuit, which would supply an energizing potential to radio 21 so long as terminal 12 exhibits the $V_{SS}$ state. (The power handling capability of output 12 is insufficient to drive the radio directly). An interface circuit which is capable of energizing radio 21, is the transistor Q2-Q3 combination. Typically, terminal 12 would be connected to the base of Q2 through resistor R4. With terminal 12 in the open-circuit state, the Q2 base voltage would be insufficient to forward bias Q2. Hence, both Q2 and Q3 would be biased OFF and Q3 would not conduct an energizing potential ($V_{SS}$) to radio 21. As described, this would be the typical operation of a circuit providing a SLEEP function.

FIG. 1, however, shows other components connected to output terminal 12, namely, resistors R1–R3, transistor Q1 and switch S3. This added circuitry converts the usual SLEEP function of the clock radio to an optional NAP/SLEEP function having the desired features. With switch S3 connected to terminal 16, S2 immediately activates the radio for the preselected time interval, and the combination provides the usual features of a SLEEP function. However, with S3 connected to terminal 17, the functional sense of the interface circuitry is inverted. When S2 is depressed, terminal 12 changes to $V_{SS}$. This causes the base-emitter junction of Q1 to be reversed biased, which causes Q1 to be OFF. With Q1 OFF, both Q2 and Q3 will be OFF due to a lack of base bias current. When Q3 is OFF, radio 21 will be OFF. After the selected time interval elapses, terminal 12 changes to an OPEN circuit allowing current to flow through voltage divider R1, R2 and R3. The base-emitter of Q1 becomes forward biased and Q1 turns ON. This provides bias current to Q2 and Q3, and hence, radio 21 is switched ON. This is precisely the desired operation of the NAP function. Summarizing the NAP operation, when S2 is depressed, radio 21 turns OFF for the present time interval. When this time interval, has elapsed, radio 21 turns ON. Therefore, depending on the position of switch S3, switch S2 becomes either a SLEEP switch or a NAP switch.

The procedure for selecting the desired time interval for the NAP function is the same procedure for selecting the SLEEP function. When S1 is depressed, causing $V_{SS}$ to be applied to input terminal 10, the digital display will cycle from 1 to 60 minutes until the switch is released. When S1 is released, the time interval setting at that point will remain for both the NAP and SLEEP functions since either function is activated with switch S2.

What is claimed is:

1. Apparatus comprising:

a clock integrated circuit having a clock input connection to which a first energizing potential may be applied and an output connection, said circuit also having first and second mutually exclusive electric states, said circuit normally being in said first state and being placed in said second state for a selected interval of time after said first potential is applied to said clock input connection, said circuit including means for selecting the duration of said interval for time intervals not greater than 60 minutes;

a radio having a radio input connection and normally being in an OFF state, said radio being placed in an ON state upon receiving a second energizing potential applied to said radio input connection;

NAP/SLEEP switch means connected to said clock circuit input connection for supplying said first energizing potential to said clock; and control means including a two position manually operable switch and being connected to said radio input connection, said control means when said switch is in one position supplying said second potential to said radio input when said clock circuit is in the first state, and said control means when said switch is in the other position also supplying said second potential to said radio input when said clock circuit is in said second state, wherein said control means further comprises:

a ground potential terminal;

a first terminal for connection to a source of energizing potential;

a first transistor having a base, emitter, and collector, said emitter being connected to said first terminal;

a second transistor having a base, emitter and collector, said collector of said second transistor being connected to said first terminal;

a third transistor having a base, emitter and collector, said collector of said third transistor being connected to said first terminal, said base of said third transistor being connected to said emitter of said second transistor, and said emitter of said third transistor being connected to said radio input;

said manually operable switch having a common terminal and first and second switch terminals, said first switch terminal being connected to said clock output and said second switch terminal being connected to said collector of said first transistor;

a first resistor connected between said first terminal and said base of said first transistor;

a second resistor connected between said base of said first transistor and said clock output;

a third resistor connected between said clock output and said ground potential; and a fourth resistor connected between the common terminal of said switch and said base of said second transistor.

* * * * *